Figure 1:
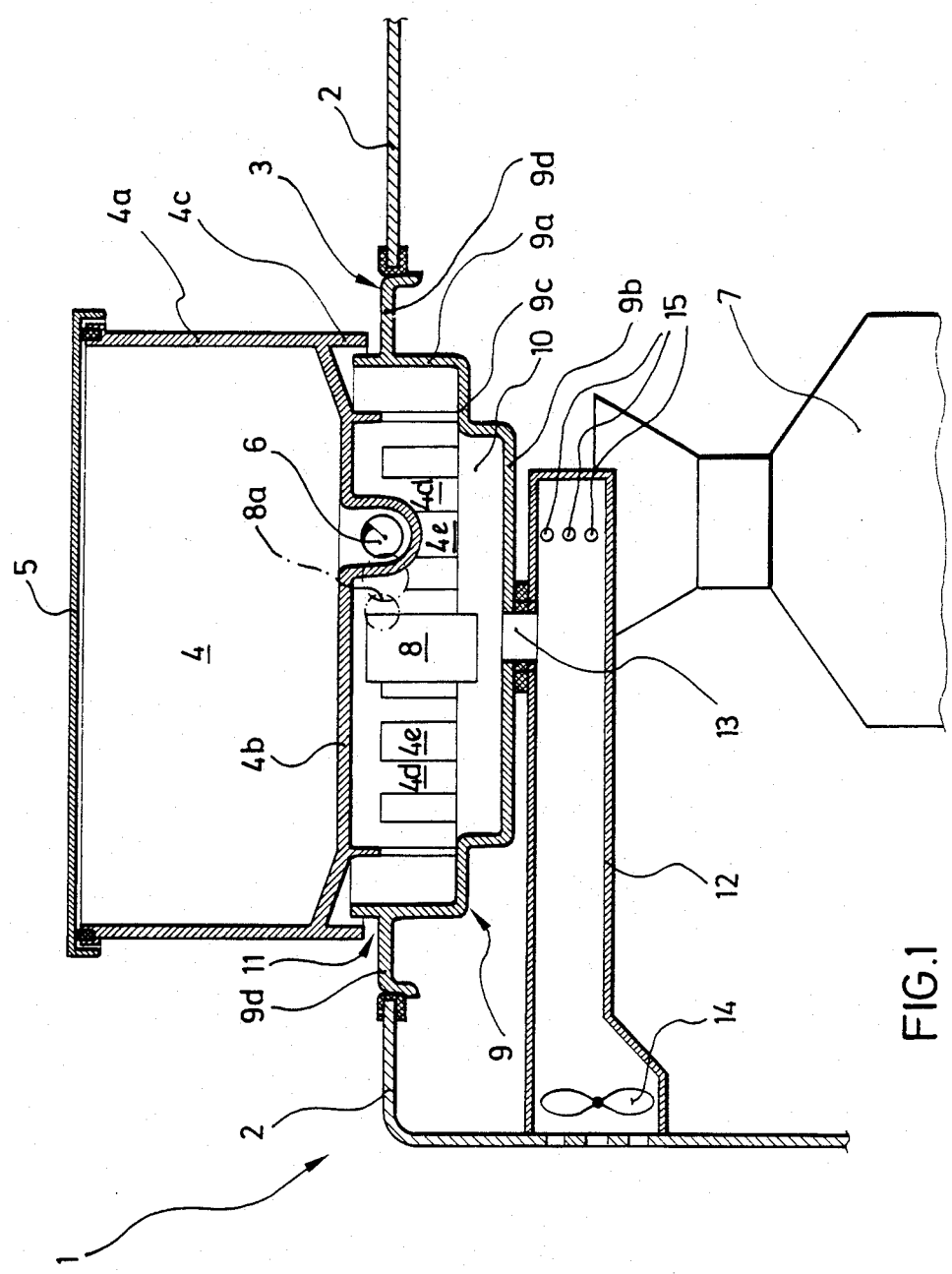

United States Patent [19]

Princz et al.

[11] Patent Number: 4,732,079

[45] Date of Patent: Mar. 22, 1988

[54] COFFEE PERCOLATOR

[75] Inventors: Erwin Princz; Hans Motsch, both of Geislingen/Steige; Peter Pulvermüller, Bad Ditzenbach, all of Fed. Rep. of Germany

[73] Assignee: Wurttembergische Metallwarenfabrik AG., Baden-Wurttemberg, Fed. Rep. of Germany

[21] Appl. No.: 833,105

[22] Filed: Feb. 25, 1986

[30] Foreign Application Priority Data

Mar. 14, 1985 [DE] Fed. Rep. of Germany ....... 3509233

[51] Int. Cl.⁴ .............................................. A47J 31/00
[52] U.S. Cl. ...................................... 99/289 R; 165/47
[58] Field of Search ............. 99/289 R, 289 T, 289 D, 99/289 P, 279; 165/47, 121; 426/433

[56] References Cited

U.S. PATENT DOCUMENTS 3,084,613  4/1963  Maxson ................................. 99/289
3,467,177  9/1969  Hoddinott ............................. 165/47
4,300,442 11/1981  Martin ............................... 99/289 R Primary Examiner—Robert W. Jenkins
Attorney, Agent, or Firm—Arnold, White & Durkee

[57] ABSTRACT

Described is a coffee percolator having a coffee meal supply container mounted at an upper portion thereof, in which heating of the coffee meal supply by the heat of the coffee percolator and the resultant loss of volatile aroma substances are avoided. This is accomplished by providing a cooling system effective to cool the bottom of the supply container. In a preferred embodiment the supply container is cooled by means of air aspirated by a fan through an air flow path extending along the bottom of the supply container and subsequently returned to the environmental atmosphere.

19 Claims, 2 Drawing Figures

COFFEE PERCOLATOR

DESCRIPTION

The present invention relates to a coffee percolator of the type defined in the generic clause of claim 1.

In the case of coffee percolators of this type, particularly in the case of fully automatized coffee percolators, a coffee supply has to be stored somewhere in the vicinity of the percolator. In order to avoid the necessity of complicated conveying means involving excessively long conveying paths from the coffee meal supply container to the brewing assembly, the supply container for coffee beans or coffee meal is usually located in the vicinity of the brewing assembly, preferably at an offset position thereabove in all types of conventional fully automatic coffee percolators. This location of the coffee supply container permits the coffee to be directly conveyed from the supply container to the brewing assembly by means of a grinding mill or a motor-driven sintering screw conveyor. In the upper portions, on the other hand, of a coffee percolator, there prevails a relatively high environmental temperature. The steam or hotwater boiler of the coffee percolator emits heat radiation, the introduction of hot water into the brewing section causes the brewing section itself as well as the connecting pipes to heat up, and additional heat is finally emitted by the motor driving the metering means, which is usually disposed directly below the supply container. In addition, the coffee meal discharge opening between the supply container and the brewing section is always open, thus enabling hot air to enter the supply container therethrough. All these factors contribute to the supply container and thus also the coffee supply contained therein being gradually heated up. This heating up results in the danger that the delicate aroma substances of the coffee, particularly coffee meal, are volatilized to an increasing degree. A shielding of the coffee supply container by a suitable designe thereof, for instance by providing it with thicker walls of a low-conduction plastic material, is not either capable in the long run of preventing the coffee supply from heating up. This applies in particular to large-volume coffee percolators of the type employed for instance in canteens and restaurants, which are usually switched on in the morning and only switched completely off in the late evening.

It is an object of the present invention to improve a coffee percolator in such a manner that any heating of the coffee supply in the supply container by the heat generated by the coffee percolator is avoided as far as possible.

This object is attained by the characterizing features of the main claim.

By positioning the cooling system below the supply container it is possible in a simple manner to protect the coffee supply from being heated by the heat emitted from the coffee percolator in the direction of the supply container. As a result, the highly volatile aroma substances particularly of coffee meal are preserved as far as possible to improve the taste of the percolated coffee.

A particularly preferred construction of the cooling system is an air cooling system.

Applicant's invention ensures in a simple manner the efficient cooling of a maximum surface area of the outer surface of the supply container, the air circulation chamber moreover acting as an additional protection against heat radiation.

Another embodiment discloses a particulary preferred arrangement of the air flow path effective to prevent the cooling system from being contaminated by the aspiration of contaminants, particularly of accidentally spilled coffee meal, together with the cooling air.

A further improvement of the air circulation is achieved by locating the fan outside of the air circulation chamber.

Another embodiment offers the additional advantage of permitting the supply container to be readily dismounted for cleaning in the usual manner.

In another embodiment the supply container and cooling assembly are readily replaceable.

During the transfer of coffee meal to the brewing container it is unavoidable that steam escaping from the brewing assembly is condensed on the coffee meal discharge opening and on the grinding mill or metering screw conveyor, respectively, resulting in the coffee meal adhering to and forming agglomerations on these portions. This effect is avoided by exhausting the escaping water vapour.

Figure 2:
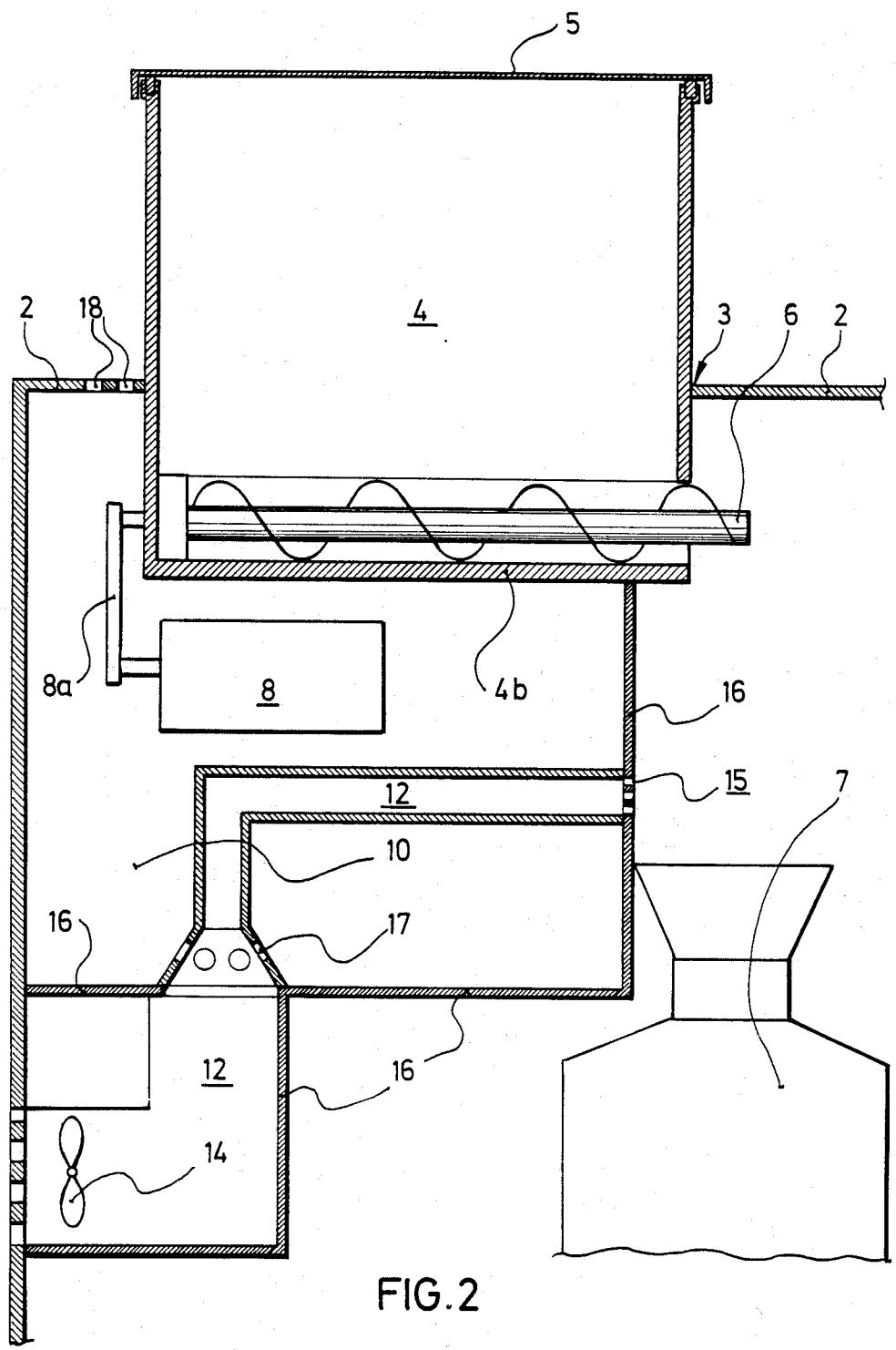

Embodiments of the invention shall now be described in detail by way of example with reference to the accompanying drawings, wherein:

FIG. 1 shows a diagrammatical illustration of a first embodiment of the invention, and FIG. 2 a diagrammatical illustration of a further embodiment of the invention.

Diagrammatically shown in FIG. 1 are parts of a coffee percolator generally indicated at 1. The drawing shows part of a housing 2 of coffee percolator having an opening 3 formed therein. Disposed above opening 3 is a coffee meal supply container 4. Supply container 4 is of substantially cylindrical configuration having a vertical sidewall 4a and a bottom 4b. The top of supply container 4 is closed by a cover 5, its bottom 4b being formed with a recess accommodating a metering screw conveyor 6 for conveying metered amounts of coffee meal from supply container 4 to a brewing section diagrammatically indicated at 7. Metering screw conveyor 6 is driven by a motor 8 disposed below bottom 4b of supply container 4 and connected to metering screw conveyor 6 via a transmission gear 8a.

Supply container 4 is formed with a peripheral rim 4c projecting towards housing 2 of coffee percolator 1 in alignment with peripheral wall 4a. Bottom 4b carries a substantially circular arrangement of blades 4d extending in the same direction as projecting rim 4c and forming at least the lateral boundaries of passages 4e therebetween.

Disposed below supply container 4 in coaxial alignment therewith is a saucer-shaped member 9 received in opening 3 of housing 2 of coffee percolator 1. Saucer-shaped member 9 is likewise of cylindrical configuration having a vertical wall 9a and a bottom 9b.

Formed between bottom 9b and vertical wall 9a is a circumferentially extending shoulder 9c. Somewhat below the upper edge of peripheral wall 9a, saucer-shaped member 9 is provided with an outwards projecting peripheral flange 9d by means of which saucer-shaped member 9 is secured, preferably in a releasable manner, in opening 3 of housing 2.

The diameter of bottom 9b of saucer-shaped member 9 is smaller than that of the circular arrangement of blades 4d carried by supply container 4. The diameter of vertical wall 9a of saucer-shaped member 9 is greater than that of the circular arrangement of blades 4d, but smaller than that of projecting rim 4c of supply container 4. The differences of these diameters are selected so that a gap remains between the interior face of projecting rim 4c and the outer face of vertical wall 9a, and between the interior face of vertical wall 9a and the outer periphery of blades 4d, respectively. Blades 4d project from bottom 4b of supply container 4 for a distance permitting them to abut the circumferential shoulder 9c of saucer-shaped member 9. The engagement locations are preferably formed with guide means (not shown) for coaxially aligning supply container 4 with saucer-shaped member 9 while permitting supply container to be lifted therefrom. It is also possible, however, to provide threaded connections or the like at suitable locations. The length of blades 4d and the height of projecting rim 4c of supply container 4 are dimensioned with respect to the height of sidewall 9a of saucer-shaped member 9 so that a gap remains between the lower edge of projecting rim 4c and housing 2, or horizontal flange 9d of saucer-shaped member 9, respectively, and between the upper edge of vertical wall 9a and bottom 4b of supply container 4, respectively, when blades 4d are seated on shoulder 9c. In this manner it is ensured that an air circulation chamber 10 is formed between bottom 4b of supply container 4 and bottom 9b of saucer-shaped member 9, the height of air circulation chamber 10 being determined by that of blades 4d acting as spacers. Also ensured in this manner is that the radially outer portion of air circulation chamber 10 communicates with the atmosphere via a labyrinth 11 formed by the gaps between the lower edge of projecting rim 4c and horizontal flange 9d, the inner face of projecting rim 4c and the outer face of vertical wall, and the upper edge of vertical wall 9a and bottom 4b of supply container 4.

Disposed below air circulation chamber 10 is an air duct 12 communicating with air circulation chamber 10 through a passage 13 formed in bottom 9b of saucer-shaped member 9. Communication of air duct 12 with the atmosphere is established by openings formed in a wall of housing 2. Air duct 12 accommodates a fan 14 in the form of a helical blower wheel driven by an associated motor (not shown).

Air duct 12 is formed with further opening 15 shown in the drawings on an enlarged scale for better understanding. Openings 15 are formed at a location of air duct 12 betewen the filler opening of brewing section 7 and the discharge opening of metering screw conveyor 6. In this manner it is possible to aspirate the water vapour escaping upwards from brewing section 7 so as to prevent it from condensing on any parts coming into contact with the coffee meal.

The cooling system of the coffee percolator according to the invention operates as follows:

As operation of coffee percolator 1 is started, fan 14 is switched on simultaneously or by the actuation of independent switching means. Fan 14 then operates to aspirate atmospheric air via an air flow path defined by peripheral labyrinth 11, air circulation chamber 10, passage 13, and air duct 12. The aspiration capacity of fan 14 is so adapted to the cross-sectional air flow area through labyrinth 11 that the resultant air flow does not get strong enough for aspirating accidentally spilled coffee meal. Within air circulation chamber 10 the air flow impinges on blades 4d and flows through passage 4e, resulting in the air flow becoming turbulent. This causes the air flow to be directed along bottom 4b of supply container 4 and around motor 8 with the resultant cooling thereof. The air subsequently leaves air circulation chamber 10 through passage 13 and air duct 12 to be expelled to the exterior by fan 14. At the same time the water vapour always present in the sapce above the filler opening of brewing section 7 is aspirated and likewise expelled to the atmosphere.

FIG. 2 shows a further embodiment of the invention by way of example. Identical or similar components are designated by the same reference numerals as in FIG. 1. Coffee percolator 1 has a housing 2 with a supply container 4 partially inserted therein from above. Supply container 4 may be cylindric or of any other suitable configuration. Disposed adjacent bottom 4b of supply container 4 is metering screw conveyor 6 driven by motor 8 via gear transmission 8a. The discharge opening of metering screw conveyor 6 projects above brewing section 7 generally indicated at 7.

In this embodiment air circulation chamber 10 is defined by partitions 16 surrounding a substantially closed space below supply container 4. In this embodiment, a substantial portion of air duct 12 is disposed within air circulation chamber 10 and in communication therewith through passages 17. Disposed in a conventional manner within air duct 12 is fan 14 upstream of openings in the wall of housing 2 through which air duct 12 communicates with the atmosphere. Further openings 15 of air duct 12 are formed in partition 16 above brewing section 7.

A horizontal wall portion of housing 2 adjacent supply container 4 is foremd with openings 18 communicating with air circulation chamber 18 and preferably distributed about the periphery of supply chamber 4. Operation of fan 14 causes atmospheric air to be aspirated through openings 18 and to flow along the wall of supply container 4. The components mounted within air circulation chamber 10 cause the air flow to become turbulent before it leaves air circulation chamber 10 through passages 17 and the lower portion of air durct 12. At the same time the water vapours are aspirated through openings 15 and likewise expelled to the atmosphere in the manner already described.

The invention is not restricted to the embodiments described and illustrated by way of example. The embodiment of the invention according to FIG. 1 is thus also suitable for employ with a quadrangular supply container. The construction and arrangement of the labyrinth of the cooling system may likewise be varied. It is also possible to adopt additional provisions for preventing the aspiration of coffee meal. Also possible is the elimination of a particular air circulation space by suitably guiding the air flow. The blade-shaped air flow barriers or baffles may for instance be replaced by an annular wall formed with passages of a suitable size. Likewise, the function of spacers could be performed by other components.

Individual features of the two embodiments shown in the drawing figures may also be interchanged. The embodiment of FIG. 1 may thus for instance be provided with air inlet passages in the form of bores, while the FIG. 2 embodiment may include a labyrinth.

The embodiment according to FIG. 2 may also be provided with additional flow barriers or baffles. By the same token, the passages opening into the air duct may be located at any position along the air duct instead of at the positions shown. The size of the air circulation chamber could be reduced, in which case the air duct would have to be located at a higher level.

Both embodiments may also be provided wtih other suitable means for generating a cooling air flow. The supply container may be fixedly connected to the air circulation chamber in a unitary structure for mounting in the coffee percolator. Finally, in the case of coffee percolators in which an aspiration of water vapours is not necessary, the direction of the air flow may be reversed, that is, the air may be directed through the air duct into the air circulation chamber, and from there to the exterior.

Also contemplated is the use of water as a coolant, although this would involve increased structural complications.

We claim:

1. A coffee percolator having a supply container mounted at its upper portion for containing a supply of coffee, coffee meal metering means at the bottom portion of said supply container, a driving motor for driving said metering means, a cooling system adjacent the bottom portion of said supply container for reducing the thermal load on the coffee supply, said cooling system including a fan and at least one air flow path extending along at least one of the exterior of the bottom of said supply container and said driving motor, and an air circulation chamber accomodating said driving motor, wherein said air circulation chamber has an air inlet and further wherein the portion of said air flow path adjacent the air inlet is formed as a labyrinth the cross-sectional air inlet area of which is dimensioned in proportion to the aspiration capacity of said fan so as to avoid the aspiration of coffee meal from the outside.

2. A coffee percolator according to claim 1, characterized in that said fan is disposed in an air duct below said air circulation chamber communicating with said air circulation chamber through at least one connecting passage.

3. A coffee percolator according to claim 2, characterized in that said air circulation chamber contains at least one baffle positioned therein.

4. A coffee percolator according to claim 3, characterized in that said baffle includes a plurality of blades connected to the bottom of said supply container and projecting freely into said air circulation chamber.

5. A coffee percolator according to claim 1, characterized in that the wall of said air circulation chamber is composed of two parts, an upper wall of said air circulation chamber being formed by the bottom of said supply container, and a bottom wall, by the bottom of a substantially saucer-shaped member that spacers are provided between said two walls, and in that the sidewall of said air circulation chamber is formed by a downwards projecting rim portion of said supply container and a vertical wall of said saucer-shaped member, the dimensions of said rim portion and of said vertical wall being selected so as to permit said labyrinth of the air flow path to be formed therebetween.

6. A coffee percolator according to claim 5, characterized in that said spacers are formed by said baffle blades.

7. A coffee percolator according to claim 6, characterized in that said saucer-shaped member is adapted to be received in a recess of the housing of the coffee percolator.

8. A coffee percolator according to claim 7, characterized in that said fan additionally communicates with the space between a discharge end of said metering means and a brewing section for the aspiration of rising water vapour.

9. A coffee percolator comprising:
(a) a housing having an opening in its top;
(b) a coffee supply container for containing a supply of coffee located above the opening in said housing;
(c) a motor driven coffee metering means at the bottom of the supply container operable to meter coffee from the supply container into the percolator;
(d) a chamber interposed below the supply container, configured to protect the supply container from any heat load directed at the supply container;
(e) a cooling system in said chamber; and
(f) coolant in said cooling system adapted to circulate through said chamber to reduce said heat load.

10. The coffee percolator of claim 9, wherein said cooling system comprises a fan and at least one air flow path extending along at least one of the exterior of the bottom of said supply container driving said metering means.

11. The coffee percolator of claim 10, wherein said driving motor is housed in an air circulation chamber positioned at the outside of said supply container.

12. The coffee percolator of claim 11, wherein the said portion of said air flow path adjacent the air inlet into said air circulation chamber is formed as a labyrinth, the cross-sectional air inlet area of which is dimensioned in proportion to the aspirating capacity of said blower so as to avoid the aspiration of coffee meal from the outside.

13. The coffee percolator of claim 12, wherein said air circulation chamber contains at least one baffle positioned therein.

14. The coffee percolator of claim 13, wherein said baffle includes a plurality of blades connected to the bottom of said supply container and projecting freely into said air circulation chamber.

15. The coffee percolator of claim 14, wherein the wall of said air circulation chamber is composed of two parts, an upper wall of said air circulation chamber being formed by the bottom of said supply chamber, and a bottom wall, by the bottom of a substantially saucer-shaped member, said two walls being separated by spacers provided between said two walls, and in that the side wall of said air circulation chamber is formed by a downwards projecting rim portion of said supply container and a vertical wall of said saucer-shaped member, the dimensions of said rim portion and of said vertical wall being selected so as to permit said labyrinth of said air flow path to be formed therebetween.

16. The coffee percolator of claim 15, wherein said spacers are formed by said baffle blades.

17. The coffee percolator of 16, wherein said saucer-shaped member is adapted to be received in the opening of said housing.

18. The coffee percolator of claim 17, further comprising a brewing section located below said cooling system.

19. The coffee percolator according to claim 18, wherein said fan additionally communicates with the space between the discharge end of said metering means and said brewing section for the aspiration of rising water vapor.

* * * * *